No. 651,164. Patented June 5, 1900.
A. W. FRANCIS.
LOCK NUT.
(Application filed Nov. 22, 1898.)
(No Model.)

WITNESSES:
J. P. Appleman
A. M. Haymaker

INVENTOR
A. W. Francis
BY
N. C. Evert & Co.
ATTORNEYS.

UNITED STATES PATENT OFFICE.

ALBERT W. FRANCIS, OF BEAVER FALLS, PENNSYLVANIA.

LOCK-NUT.

SPECIFICATION forming part of Letters Patent No. 651,164, dated June 5, 1900.

Application filed November 22, 1898. Serial No. 697,160. (No model.)

*To all whom it may concern:*

Be it known that I, ALBERT W. FRANCIS, a citizen of the United States of America, residing at Beaver Falls, in the county of Beaver and State of Pennsylvania, have invented certain new and useful Improvements in Lock-Nuts, of which the following is a specification, reference being had therein to the accompanying drawings.

My invention relates to certain new and useful improvements in nut-locks.

The object of my invention is to provide simple and effective means for locking a nut upon the bolt, so as to prevent it from becoming loosened accidentally.

The invention relates to nut-locking devices or arrangements for bolts in which the locking-pin is used to prevent the nut from becoming accidentally or improperly worked off the bolt. It is applicable to any other purpose for use in which such result is desired to be attained, including bolts for railroads, bridges, wagons, or vehicles of different kinds, and for fastening fish-plates or rails on railroads.

Briefly described, my invention consists in a straight metallic locking-pin arranged to operate in the elongated groove formed in the bolt for locking the nut thereon, and to prevent the displacement thereof a V-shaped recess is formed in the screw-threaded portion of the nut to receive the locking-pin when it is desired to screw upon the bolt the nut.

My invention finally consists in the novel combination and arrangement of parts hereinafter more fully described, and particularly pointed out in the claim.

In describing the invention in detail reference is had to the accompanying drawings, forming a part of this specification, wherein like numerals of reference indicate corresponding parts throughout the several views thereof, and in which—

Figure 1:
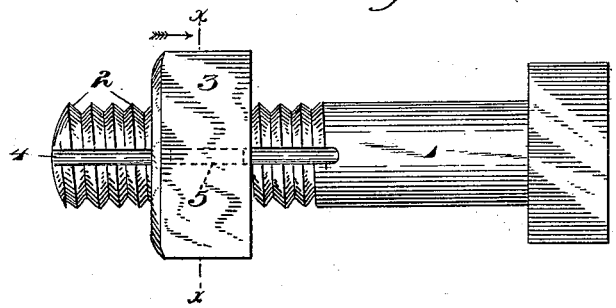
Figure 1:
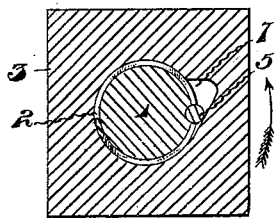
Figure 1:
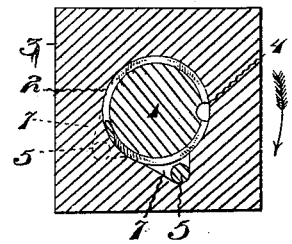
Figure 1:
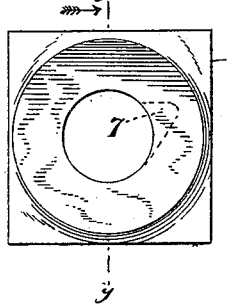
Figure 1:
Figure 1:
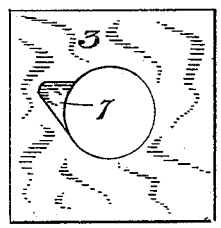
Figure 1:
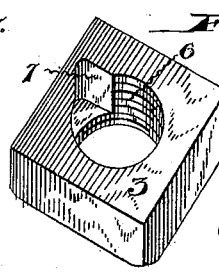

Figure 1 is a side view of my improved nut-lock, showing the locking-pin in dotted lines. Fig. 2 is a vertical sectional view thereof on the line *x x*, Fig. 1, showing the nut in a locked position. Fig. 3 is a vertical sectional view of my improved nut-lock, showing the position of the locking-pin while screwing the nut upon the bolt. Fig. 4 is a top plan view of the nut-lock in dotted lines and V-shaped recess for the locking-pin. Fig. 5 is a cross-sectional view of the nut, showing the V-shaped cavity formed in the screw-threaded portion thereof. Fig. 6 is an inverted plan view of the nut, showing the V-shaped recess. Fig. 7 is a perspective view of the locking-pin. Fig. 8 is a perspective view of the nut.

Referring to the drawings by reference-numerals, 1 indicates the bolt, having a screw-thread 2 formed on its inner end, upon which the nut 3 is fitted to screw. The elongated groove 4 is made within this screw-threaded portion 2 of the bolt and is extended down below the threads of the screw and serves to receive within it the locking-pin 5, of any suitable metal and of less length than the width of the nut. The end of the screw-threaded portion 6 of the nut 3 has a V-shaped recess 7 formed therein, into which the locking-pin 5 is adapted to fit when screwing the nut upon the bolt. It will be readily observed that the nut will be prevented from unscrewing, as upon such movement of the nut the locking-pin will fall into the elongated groove and prevent such movement thereof.

The bolt is adapted to be inserted in the rails or other objects, so that the elongated groove will always be at right angles; otherwise the device would be inoperative.

It will be noted that various changes may be made in the details of construction without departing from the general spirit of my invention.

Having thus fully described my invention, what I claim as new, and desire to secure by Letters Patent, is—

The combination with a bolt having a threaded portion with a semicircular groove extending longitudinally through the bolt throughout the length of the threaded portion, of a nut adapted to be mounted upon and engaging the said threaded portion of the bolt, said nut being provided on its inner face with a substantially V-shaped recess which registers with the threaded opening of the nut with one of its side walls on a plane parallel to the axis of the bolt and the other of said side walls at an angle thereto, and a cylindrical locking-pin of a length not exceeding the depth of said recess adapted to rest within the semicircular groove in the bolt and lock against the inclined wall of the recess, substantially as shown and described.

In testimony whereof I affix my signature in the presence of two witnesses.

ALBERT W. FRANCIS.

Witnesses:
JOHN NOLAND,
E. W. ARTHUR.